United States Patent [19]

O'Hara et al.

[11] Patent Number: 4,491,752
[45] Date of Patent: Jan. 1, 1985

[54] ELECTRICAL CONNECTION SYSTEM FOR SWITCHES

[75] Inventors: Frank J. O'Hara, Hanover, Pa.; John E. Dibbern, Jr., Street; Gregory E. Moores, Reisterstown, both of Md.

[73] Assignee: Black & Decker Inc., Newark, Del.

[21] Appl. No.: 480,725

[22] Filed: Mar. 31, 1983

[51] Int. Cl.³ .................................. H02K 11/00
[52] U.S. Cl. ........................... 310/71; 310/43; 310/89; 310/90
[58] Field of Search ............ 310/47, 50, 71, 68 A, 310/68 B, 71, 89, 90, 93, 45; 339/58, 147 R; 200/157

[56] References Cited

U.S. PATENT DOCUMENTS

| | | | |
|---|---|---|---|
| 1,848,870 | 5/1932 | Apple | 310/43 |
| 1,849,263 | 3/1932 | Apple | 310/71 |
| 2,045,218 | 6/1936 | Desutter | 310/50 |
| 2,045,219 | 6/1936 | Desutter | 310/50 |
| 2,243,063 | 5/1941 | Arey | 310/77 |
| 2,534,951 | 12/1950 | Cargill | 74/843 |
| 3,210,577 | 10/1965 | Hogue | 310/71 |
| 3,248,582 | 4/1966 | Brown | 310/71 |
| 3,344,291 | 9/1967 | Pratt | 310/50 |
| 3,432,703 | 3/1969 | Sheps | 310/43 |
| 3,440,465 | 4/1969 | Pratt | 310/50 U X |
| 3,456,743 | 6/1969 | Badcock | 173/117 |
| 3,484,860 | 12/1969 | Csaki | 310/43 |
| 3,502,915 | 3/1970 | Moret | 310/71 |
| 3,603,824 | 9/1971 | Csald | 310/71 |
| 3,604,964 | 9/1971 | Conrad | 310/71 |
| 3,636,393 | 2/1970 | Pieper | 310/71 |
| 3,903,440 | 9/1975 | Paule | 310/50 |
| 3,984,712 | 10/1976 | Hill | 310/71 |
| 4,038,574 | 7/1977 | Crow | 310/71 |
| 4,056,749 | 11/1977 | Carlson | 310/71 |
| 4,090,098 | 5/1978 | Kranzler | 310/71 |
| 4,206,959 | 6/1980 | Devries | 310/71 |
| 4,307,508 | 12/1981 | Anderson | 310/71 |
| 4,370,579 | 1/1983 | Kobayashi | 310/50 |
| 4,442,366 | 3/1984 | Cuneo | 310/50 |

FOREIGN PATENT DOCUMENTS

| | | | |
|---|---|---|---|
| 648055 | 12/1928 | France | 310/71 |
| 428839 | 5/1935 | United Kingdom | 310/71 |

Primary Examiner—R. Skudy
Attorney, Agent, or Firm—Ronald B. Sherer; Harold Weinstein; Edward D. Murphy

[57] ABSTRACT

A switch has a body mounted directly on the rear bearing boss of the integral web portion of a molded plastic field case for a power tool or other motor-driven device. The switch has a pair of spaced contacts engaging the respective rearward end portions of a complementary pair of contact elements carried by the web portion of the field case. The respective forward end portions of the contact elements are connected to respective terminals on the field.

3 Claims, 9 Drawing Figures

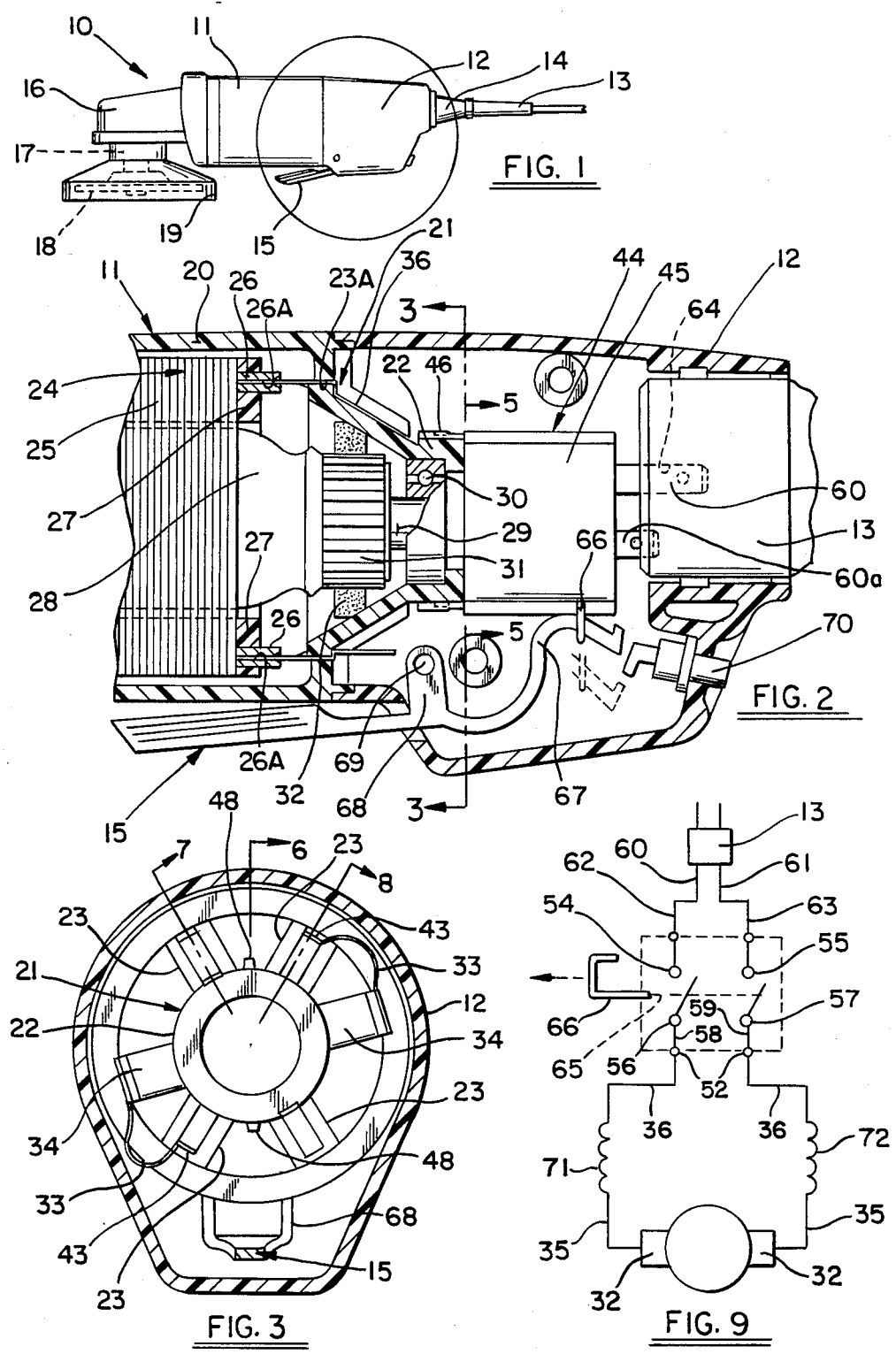

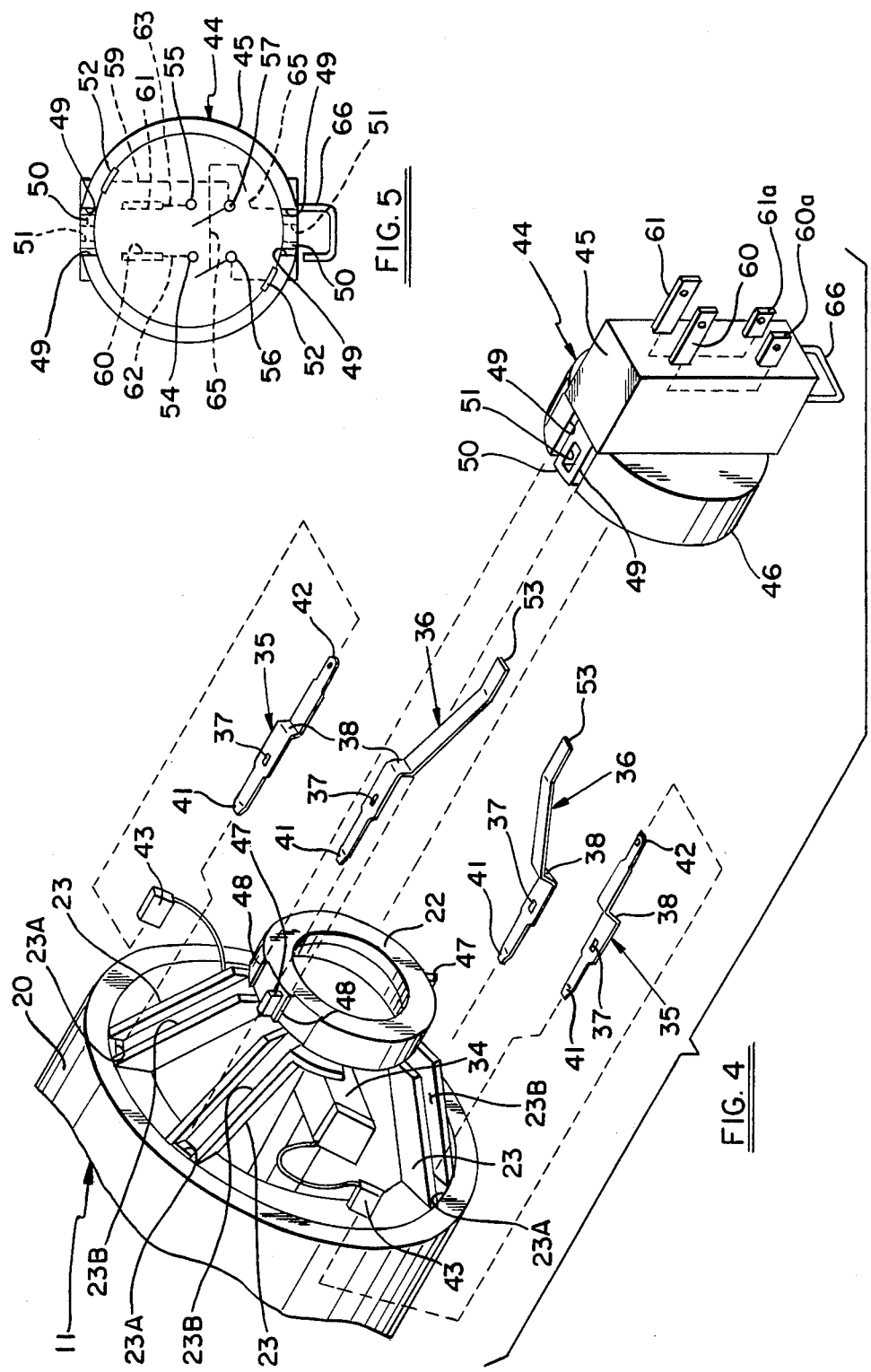

4,491,752

ELECTRICAL CONNECTION SYSTEM FOR SWITCHES

CROSS-REFERENCE TO RELATED APPLICATION

The subject matter of this patent application is related to that disclosed in corresponding U.S. patent application Ser. No. 480,781, filed on 3/31/83, for Electrical Connection System for Motors, and assigned to the same assignee as the present application.

FIELD OF THE INVENTION

The present invention relates to an improved means and method for the connection of switches used in motor-driven devices, and more particularly, to the mounting and connection of a switch in a portable electric tool.

BACKGROUND OF THE INVENTION

Power tools and other motor-driven appliances and devices are provided with a control switch to energize the device. The switch may be of the simple "on/off" type and may, if desired, include a variable-speed electronic control circuit. Moreover, actuation of the switch involves a manually-manipulatable element, such as a toggle, slider, push button, trigger, lever or so-called "paddle". The control switch and its actuator are mounted in the tool housing, usually adjacent to the control handle for convenient manipulation by the operator, and the switch is connected to the line cord (leading to the power source) by wires or other suitable conductors that are usually disposed within the tool handle. The switch is also connected to the field with wires.

While adequate for the purposes intended, these structures and methods of assembly and electrical connection have certain inherent disadvantages or deficiencies, such as the lack of standardization and the additional assembly and connection time which is required.

SUMMARY OF THE INVENTION

Accordingly, it is an object of the present invention to alleviate the disadvantages and deficiencies of the prior art by providing a novel assembly and electrical connection of the control switch in a power tool or other device.

It is another object of the present invention to provide for a standardized mounting and electrical interconnection of the switch in a power tool or other device.

It is yet another object of the present invention to reduce the mounting and associated connection time for switches in power tools or other devices.

It is a further object of the present invention to provide an improved method for mounting the control switch in a power tool or other motor-driven device and assuring the electrical connection of the switch with the motor during the mechanical assembly of the switch to the motor housing, thereby eliminating the necesssity for wires or other electrical conductors and the connection thereof.

In accordance with the teachings of the present invention, an electric motor has a field case made from an insulating material. The field case includes a integral web portion having a rear bearing boss and further having a plurality of circumferentially-spaced bridge members integrally joining the bearing boss to the substantially-cylindrical main portion of the field case. An armature has a shaft journaled in a bearing in the rear bearing boss. The armature shaft carries a commutator, and brushes are carried by the field case for engaging the commutator. A field is inserted through the open forward position of the field case and is secured therein. The field carries respective terminals. Two pairs of contact elements are mounted on the respective bridge members. These contact elements have respective forward and rearward end portions. The forward end portions of the two pairs of contact elements engage and are connected to the terminals on the field, when the field is inserted into the field case and is secured therein. The rearward end portions of the first pair of contact elements are connected to the brush shunts.

Also in accordance with the teachings of the present invention, the control switch is mounted directly on the rear housing boss; and the switch has a pair of spaced contacts which engage (and make electrical connection with) the respective rearward end portions of the second pair of contact elements.

These and other objects of the present invention will become apparent from a reading of the following specification, taken in conjunction with the enclosed drawings.

BRIEF DESCRIPTION OF THE DRAWINGS

FIG. 1 is a side elevation of a typical motor-driven device (in this case a portable electric grinder) to which the teachings of the present invention may be applied.

FIG. 2 is the circled portion of FIG. 1, drawn to an enlarged scale and with parts broken away and sectioned, showing the switch mounted directly on the rear bearing boss of the molded field case, and further showing one means for actuating the switch;

FIG. 3 is a section view, taken along the lines 3—3 of FIG. 2, and showing (in elevation) the rear bearing boss, the integral bridge members on the web portion of the field case, and the brush holders for the brushes which engage the commutator;

FIG. 4 is an exploded perspective, showing the rear portion of the field case, the two pairs of contact elements to be mounted on the respective bridge members, and the switch to be mounted on the rear bearing boss of the field case;

FIG. 5 is a front elevation of the switch, showing the pair of spaced contacts carried by the switch body, and further showing (schematically and in broken lines) the electrical connections within the switch;

FIG. 9 is an electrical schematic diagram showing the switch actuator, and further showing the connections to the armature and field coils of the motor.

DESCRIPTION OF THE PREFERRED EMBODIMENT

Figure 6:
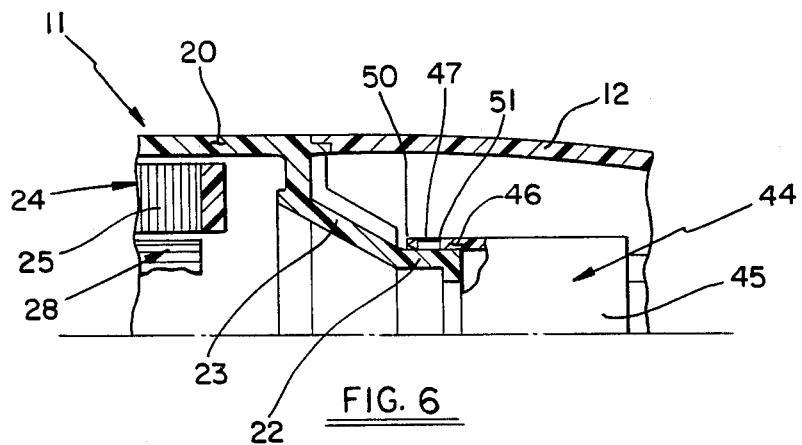
FIG. 6 is a section view, taken along the lines 6—6 of FIG. 3, showing a preferred mounting of the switch body on the rear bearing boss of the field case.

With reference to FIG. 1, there is illustrated a portable electric small angle grinder 10 incorporating the present invention. It will be appreciated by those skilled in the art, however, that the teachings of the present invention are not necessarily confined to the small angle grinder 10, but rather, are equally applicable to a wide variety of power tools, appliances, motor-driven products, electrical motors, and other electrical devices. With this in mind, the grinder 10 generally includes a motor housing 11, a handle 12 secured rearwardly of the motor housing, a line cord 13 including a strain relief portion 14 rearwardly of the handle, a manually-manipulatable lever or "paddle" member 15 depending from the handle for controlling the energization of the tool, a gear case 16 mounted forwardly of the motor housing, a right-angle spindle 17 depending from the gear case, a grinding wheel 18 (or other tool element) mounted on the spindle, and a guard 19 for the wheel.

With reference to FIGS. 2 and 3, the motor housing includes a generally-cylindrical field case 20. The field case is formed from a dielectric or insulating material, and is injection molded from a suitable plastic material. The field case is open at its forward end (not shown) and is closed at its rearward end by an integrally molded spider or web portion 21. The web portion includes a rear bearing boss 22 and further includes a plurality of circumferentially-spaced bridge members 23 joining the rear bearing boss to the field case.

As disclosed in the aforementioned co-pending application, a field 24 is inserted through the open forward portion of the field case and is seated within the field case and secured therein by screws or other suitable means (not shown herein). The field includes a field core 25 having a stack of laminations and further includes a pair of field coils (not shown in FIG. 2). Each of the field coils has a pair of leads conected to respective terminals 26. Thus the field is provided with four terminals 26 (two of which are shown in FIG. 2) and the terminals are disposed on a insulated terminal block 27 mounted on the field core. An armature 28 is inserted within the field. The armature has a shaft 29 journaled in a bearing 30 in the rear bearing boss. A commutator 31 is carried by the armature shaft, and a pair of brushes 32 engage the commutator. The brushes have respective shunts 33 (shown in FIG. 3) and are mounted in respective brush holders 34. The brush holders are part of a brush carrier (not shown) which is mounted on the field.

With reference again to FIGS. 2 and 3, and with further reference to FIGS. 4 and 6–8, first and second pairs of contact elements 35 and 36 are mounted on the integral web portion of the field case. These contact elements include bent contact strips (as shown more clearly in FIG. 4) which are formed from a suitable conductive material. As disclosed in the aforementioned co-pending application, each of the bridge members 23 has a slotted opening 23A formed therein (generally adjacent to the field case) through which the respective contact strips may be inserted. The bridge members also have U-shaped channels 23B formed therein for supporting the contact strips. Each of the contact strips has a lanced-out spring tang 37 and further has a downwardly-bent ledge portion 38 for engaging the forward and rearward faces 39 and 40, respectively, of the respective bridge member. Thus the contact strips may be inserted (in an axial direction) into the respective openings 23A in the bridge members 23 and may be retained therein. The contact strips have respective cantilevered forwardly-projecting end portions 41 which are received within (and make electrical connection with) the female-type sockets 26A on the respective terminals 26 on the field, when the field is inserted into the field case and is secured therein. The first pair of contact strips 35 have respective rearwardly-projecting end portions 42 which receive respective brush shunt terminal clips 43 carried on the end of the brush shunts (as shown in FIG. 4). These brush shunt terminal clips 43 are slipped over the rearward ends 42 of the first pair of contact strips. This structure and method of assembly are illustrated and described in more detail in the aforementioned co-pending application.

With reference to FIGS. 2 and 4–8, and in accordance with the teachings of the present invention, a switch 44 is provided which has a switch body 45 mounted directly on, and rearwardly of, the rear bearing boss 22 on the field case. Preferably, the switch body is provided with a forwardly-extending annular rim 46 which is complementary to and embraces the external annular surface of the rear bearing boss. This bearing surface is provided with a pair of radially-extending rectangularly-shaped locking keys 47, which are preferably diametrically opposite to one another. On either side of each key 47 is an axial or longitudinal rib 48. These ribs 48 are parallel to each other and are received in corresponding slots 49 formed in the annular rim on the switch body. Slots 49 form a flexible tongue 50 therebetween. Each of the tongues 50 is provided with a rectangular keyway or pocket 51 formed complementary to the respective keys 47 on the bearing boss. With this arrangement, the ribs 48 and cooperating slots 49 guide the annular rim 46 of the switch body on the bearing boss and orient or position the switch body, circumferentially, with respect to the bearing boss. As the switch body is slidably received on the bearing boss, the tongues 50 flex radially outwardly sufficiently to ride up over the radially projecting keys 47, the keys being received in the respective pockets 51, thereby enabling the switch body to be mounted on the bearing boss with a "snap action" and securely retaining the switch body on the bearing boss.

Figure 7:
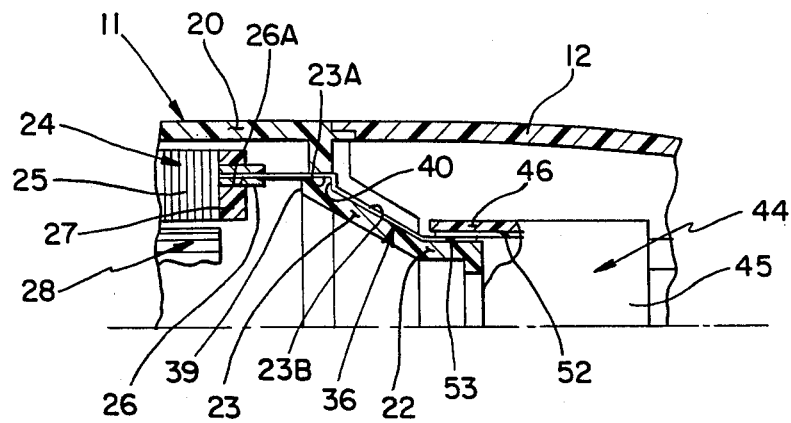
FIG. 7 is a section view, taken along the lines 7—7 of FIG. 3, showing the connection between the respective rearward end portion of one of the contact elements on the field case and a respective contact carried by the switch body.
Figure 8:
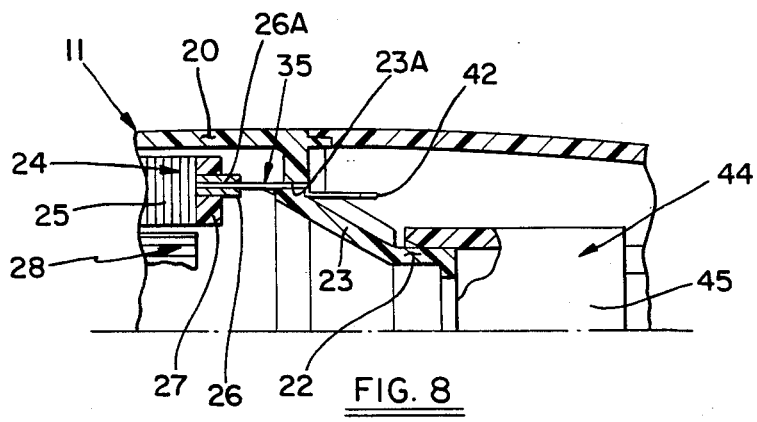
FIG. 8 is a section view, taken along the lines 8—8 of FIG. 3, and showing the connection between the respective forward end portion of one of the contact elements on the field case and a respective one of the terminals carried by the field subassembly.

The switch body has a pair of spaced internal contacts 52 (shown in FIG. 5) which are diametrically opposed to one another. These contacts 52 engage (and make electrical connection with) the respective rearward end portions 53 of the second pair of contact strips 36. As shown in FIG. 7, the contacts 52 are cantilever mounted forwardly on the switch body. When the switch body is received on the bearing boss, the contacts 52 and the rearward end portions 53 of the second pair of contact strips 36 are radially wedged together between the external annular surface of the bearing boss 22 on the field case and the annular rim 46 on the switch body.

Thus it will be appreciated that the electrical connection of the switch to the motor is automatically facilitated as the switch is mechanically assembled to the motor housing. This is a substantial improvement in the art and, while not necessarily restricted thereto, has application to the assembly and electrical connection of switches used in power tools, especially of the "end handle" type as disclosed herein. Although the switch 44 is an "on/off" control switch, a variable speed switch could be used, if desired.

With reference to FIG. 5, the switch shown is of the double-pole single-throw type and is provided with internal contacts 54, 55, 56 and 57, respectively. The spaced contacts 52 are connected to internal contacts 56 and 57 by suitable conductors 58 and 59, respectively, which are illustrated schematically. The remaining internal contacts 54 and 55 are connected to external male prongs 60 and 61 via suitable conductors 62 and 63, respectively, which are also illustrated schematically. The prongs 60 and 61, which are shown more clearly in FIG. 4, are connected to complementary sockets within a receptacle 64 formed within the detachable line cord 13 (as shown in FIG. 2). However, it will be appreciated that other electrical connections internally of the switch body and externally to a suitable power source are clearly within the scope of the present invention. For example, auxiliary prongs 60a, 61a may be used to provide connection to a non-detachable cordset.

With reference again to FIGS. 2, 3 and 5, the switch is provided with an internal switch actuator 65 (illustrated in FIG. 5 schematically by broken lines) which is mechanically connected to an external formed-wire strap 66. This strap is substantially U-shaped and embraces the rearward portion 67 of the elongated paddle member 15. The paddle member 15, which is molded from a suitable plastic material, has a projection 68 intermediate its length which is pivotally connected to an upstanding boss or pin 69 formed integrally in the housing. With this arrangement, the tool housing may be grasped by the operator's hand, and the operator's fingers may engage the paddle to depress the paddle upwardly towards the housing thereby moving the strap downwardly, as indicated by the broken lines in FIG. 2 and closing the switch to energize the tool. Moreover, a spring-loaded locking button 70 may be depressed (if desired) to retain the paddle in the "on" position of the switch. Further depression of the paddle will disengage the locking button, as understood by those skilled in the art.

With reference to FIG. 9, the field coils 71 and 72 are connected in series with the armature 28 by means of the first pair of contact strips 35 connected to the brushes 32. The field coils and armature thus comprise a conventional universal motor used in the tool 10, although other motor designs are equally applicable with the present invention. The field coils 71 and 72 are also connected to the switch by means of the second pair of contact strips 36.

Obviously, many modifications may be made without departing from the basic spirit of the present invention. Accordingly, it will be appreciated by those skilled in the art that within the scope of the appended claims, the invention may be practiced other than has been specifically disclosed herein.

What is claimed is:

1. In a power tool, the combination of a field case made from an insulating material, the field case including a web portion having a rear bearing boss, a field mounted in the field case, terminal means on the field, a switch having a switch body, means for mounting the switch on the bearing boss, the means for mounting the switch on the bearing boss including a forwardly-projecting annular rim on the switch body, the bearing boss having an external annular surface complementary to the annular rim on the switch body, means for slidably positioning the annular rim of the switch body on the external annular surface of the bearing boss, the means for slidably positioning the annular rim of the switch body on the external annular surface of the bearing boss including two pairs of parallel longitudinal ribs formed on the bearing boss, the pairs of ribs being substantially diametrically opposite to one another, the rim having two pairs of slots formed therein complementary to the pairs of ribs, whereby the ribs may be received in the corresponding slots, thereby positioning the switch body circumferentially with respect to the bearing boss, the annular rim on the switch body having a resilient tongue formed thereon between each pair of slots, whereby the tongue is urged radially outwardly as the switch body is slidably received on the bearing boss, keying means between the rim and the bearing boss, the keying means between the rim and the bearing boss including a radially-projecting key on the bearing boss between a pair of ribs, each tongue having a complementary pocket formed therein to receive a respective key, a pair of spaced contacts in the switch, and respective contact means carried by the web portion of the field case for electrically interconnecting the terminal means on the field with the spaced contacts in the switch.

2. The combination of claim 1, wherein the pair of spaced contacts on the switch are cantilever mounted on the switch body and are housed within a forwardly-projecting annular rim on the switch body, and wherein the spaced contacts in the switch and the contact means carried by the web portion of the field case are wedged together in a radial direction between the annular rim on the switch body and the external annular surface of the bearing boss.

3. In an electric motor, the combination of a motor housing having a portion made from an insulating material and provided with an external bearing surface, at least one pair of longitudinal ribs formed on the surface, a radially-projecting key between the ribs, a switch having a body provided with a projecting rim complementary to the bearing surface on the motor housing, the rim having a pair of slots formed therein complementary to the ribs on the surface of the motor housing, the slots forming a resilient tongue therebetween, the tongue having a pocket formed therein complementary to the key on the surface of the motor housing, whereby the cooperating ribs and slots position the switch body circumferentially with respect to the motor housing, and whereby, as the switch body is slidably received over the surface on the motor housing portion, the tongue may is urged outwardly to ride over the key on the surface of the motor housing, the key being received in the pocket on the rim, thereby locking the switch body to the motor housing, at least one pair of contact elements carried by the motor housing portion, the contact elements having end portions disposed adjacent to the bearing surface of the motor housing portion, and the switch having a complementary pair of spaced switch contacts engaging the respective end portions of the contact elements on the motor housing portion, the contact elements and the spaced switch contacts being wedged together between the external bearing surface on the motor housing portion and the rim on the switch body.

* * * * *

UNITED STATES PATENT AND TRADEMARK OFFICE
CERTIFICATE OF CORRECTION

PATENT NO. : 4,491,752

DATED : Jan. 1, 1985

INVENTOR(S) : O'Hara et al

It is certified that error appears in the above-identified patent and that said Letters Patent is hereby corrected as shown below:

On the title page;
References Cited, U.S. Patent Documents, the first reference cited "1,848,870" should read --1,858,870--

Signed and Sealed this

Thirteenth Day of August 1985

[SEAL]

Attest:

DONALD J. QUIGG

Attesting Officer    Acting Commissioner of Patents and Trademarks